United States Patent [19]

Shimura

[11] Patent Number: 4,955,067
[45] Date of Patent: Sep. 4, 1990

[54] RADIATION IMAGE READ-OUT APPARATUS

[75] Inventor: Kazuo Shimura, Kanagawa, Japan

[73] Assignee: Fuji Photo Cilm Co., Ltd., Kanagawa, Japan

[21] Appl. No.: 325,275

[22] Filed: Mar. 17, 1989

[30] Foreign Application Priority Data

Mar. 18, 1988 [JP] Japan .................................. 63-64919
Aug. 26, 1988 [JP] Japan .................................. 63-212231

[51] Int. Cl.$^5$ .............................................. G06K 9/00
[52] U.S. Cl. .......................................... 382/62; 382/6;
382/50; 250/337; 250/327.26
[58] Field of Search ........................ 382/6, 54, 50, 62;
250/337, 327.2 G, 327.2 F; 358/447

[56] References Cited

U.S. PATENT DOCUMENTS

| | | | |
|---|---|---|---|
| 3,764,978 | 10/1973 | Tyburski et al. | 382/62 |
| 4,315,318 | 2/1982 | Kato et al. | 382/54 |
| 4,629,900 | 12/1986 | Horikawa et al. | 250/327.2 G |
| 4,810,887 | 3/1989 | Nakajima et al. | 250/327.2 G |
| 4,814,618 | 3/1989 | Saito et al. | 250/327.2 G |
| 4,861,993 | 8/1989 | Adachi et al. | 250/327.2 G |

*Primary Examiner*—Leo H. Boudreau
*Assistant Examiner*—Yon Jung
*Attorney, Agent, or Firm*—Sughrue, Mion, Zinn, Macpeak & Seas

[57] ABSTRACT

A radiation image read-out apparatus comprises a preliminary read-out device, a final read-out device, an image processor, and a condition adjuster. The condition adjuster is constituted of an operating section for calculating, from a preliminary read-out image signal, read-out conditions to be used in obtaining a final read-out image signal and/or image processing conditions to be used in image processing of a final read-out image signal, and carrying out image reproduction operating processes based on the preliminary read-out image signal so as to display images which would be reproduced if the calculated read-out conditions and/or the calculated image processing conditions were used. One of the images displayed is designated, and the operating section feeds a read-out condition and/or an image processing condition, which corresponds to the designated image, into the final read-out device and/or the image processor.

15 Claims, 8 Drawing Sheets

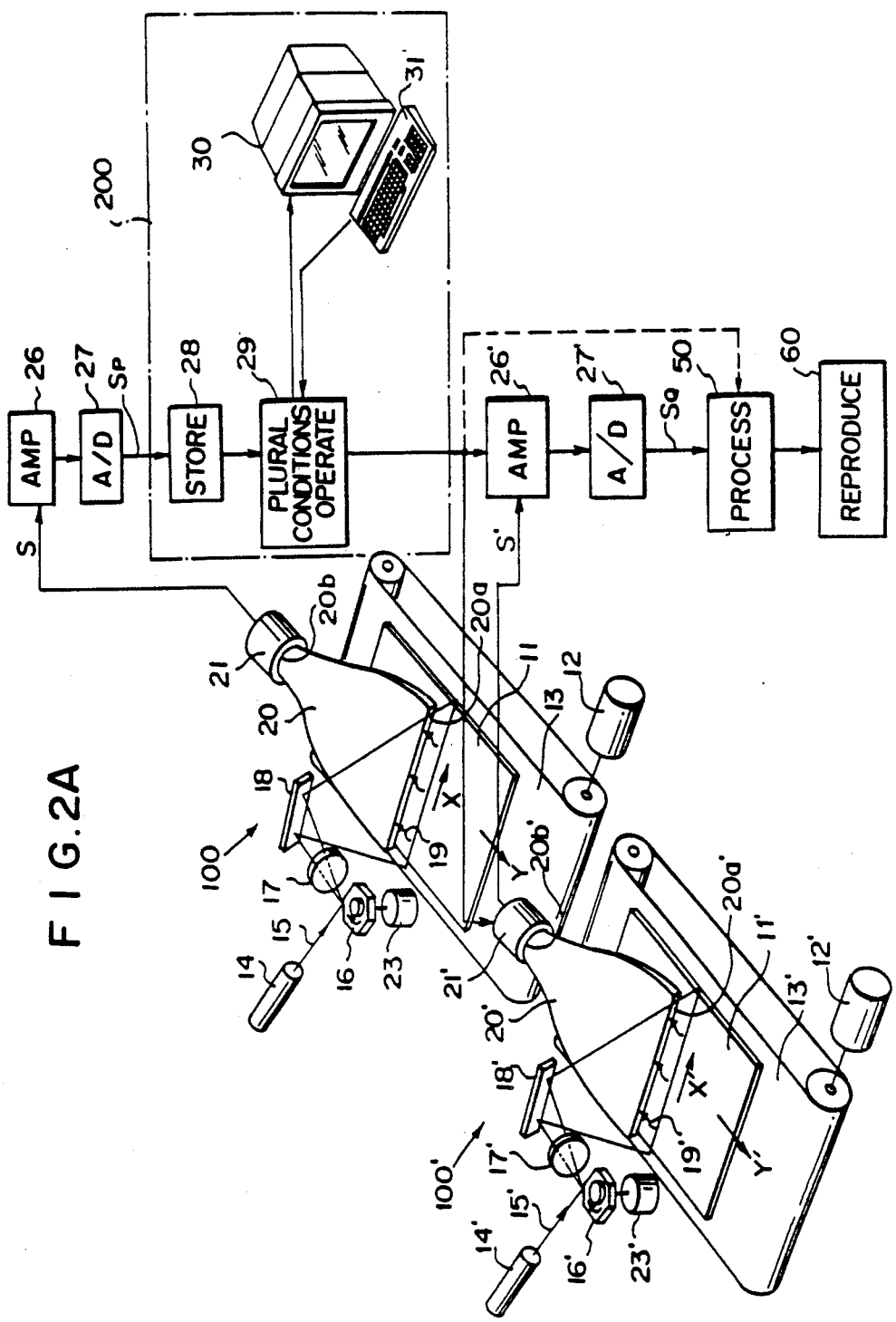

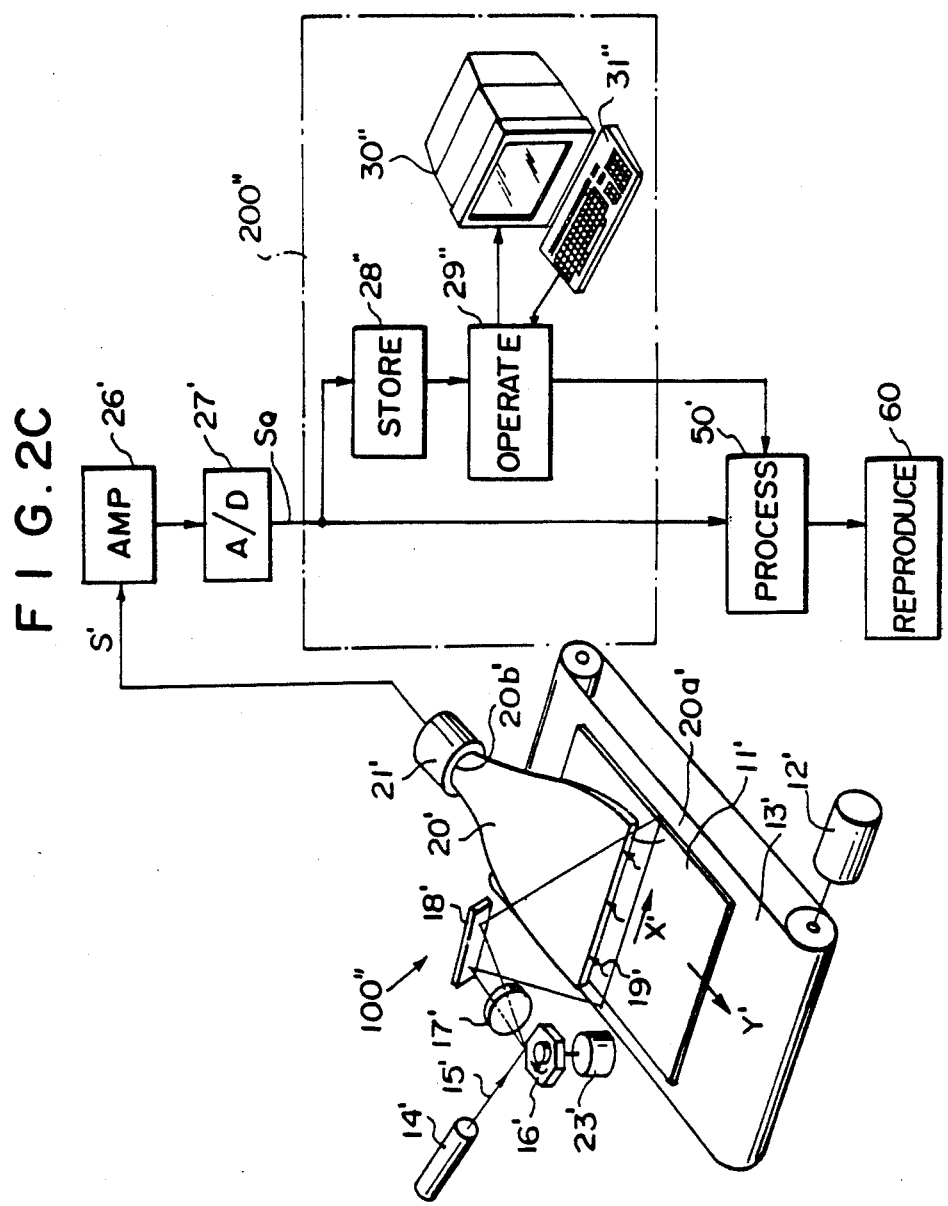

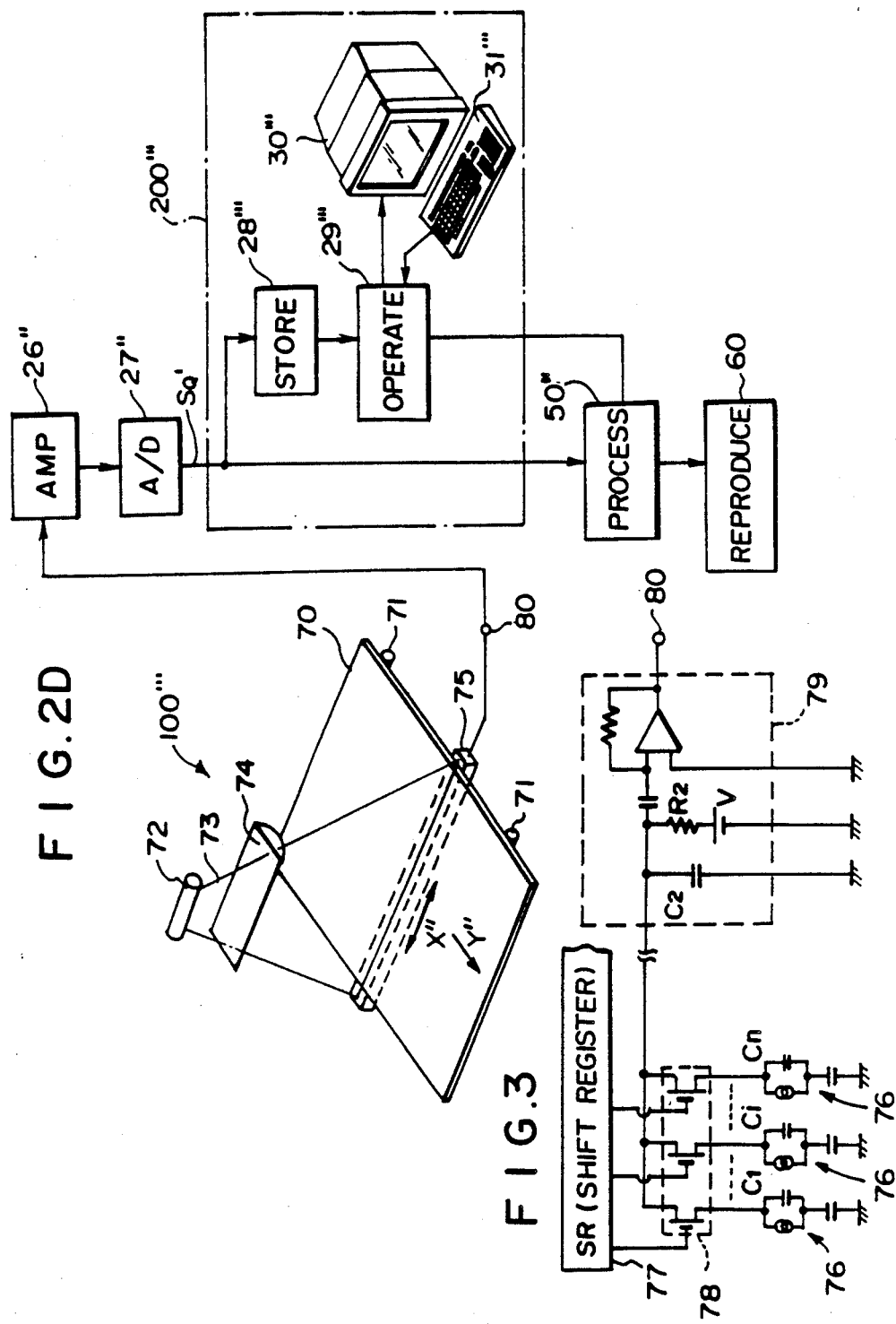

RADIATION IMAGE READ-OUT APPARATUS

BACKGROUND OF THE INVENTION

1. Field of the Invention

This invention relates to a radiation image read-out apparatus which obtains an image signal by reading out a radiation image of an object from a recording medium, such as a stimulable phosphor sheet, on which the radiation image has been recorded, and carrying out image processing of the image signal.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Pat. Publication No. 61(1986)-5193, an X-ray image is recorded on an X-ray film having a small gamma value designed for the type of image processing to be carried out, the X-ray image is read out from the X-ray film and converted into an electric signal, and the electric signal (image signal) is image-processed and then used when the X-ray image is reproduced as a visible image on a copy photograph or the like. In this manner, a visible image having good image quality and exhibiting such characteristics as high contrast, high sharpness, high graininess or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in U.S. Pat. Nos. 4,258,264, 4,276,473, 4,315,318 and 4,387,428 and Japanese Unexamined Pat. Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, which is used when the radiation image of the object is reproduced as a visible image on a recording material such as photographic film, a display device such as a cathode ray tube (CRT), or the like.

A radiation image recording and reproducing system using a stimulable phosphor sheet is advantageous over conventional radiography using silver halide in that the amount of light emitted by the stimulable phosphor sheet is proportional to the energy intensity of the radiation, to which the stimulable phosphor sheet is exposed when an image is recorded thereon, and the energy intensity of said radiation may be selected from a very wide range (latitude) of radiation energy intensities. If an appropriate read-out gain is selected and used when the light emitted by said stimulable phosphor sheet is being detected, a desirable density can be obtained in the finally reproduced visible image regardless of the energy intensity of the radiation to which the stimulable phosphor sheet was exposed.

In order to assure that the conditions under which the image signal is read out are appropriate for the radiation dose to which the stimulable phosphor sheet or the like was exposed, the aforesaid radiation image recording and reproducing system may be constituted such that a preliminary read-out operation is carried out in which the stimulable phosphor sheet is scanned with a light beam having a comparatively low energy level, and the radiation image stored on the stimulable phosphor sheet is thus approximately ascertained. A preliminary read-out image signal is obtained from the preliminary read-out operation and is then analyzed. Thereafter, a final read-out operation is carried out. The conditions under which the radiation image is read out are determined on the basis of the results of an analysis of the preliminary read-out image signal. The stimulable phosphor sheet is scanned with a light beam having a comparatively high energy level, and an image signal is obtained which will be used during the reproduction of a visible image.

The term "read-out condition" as used herein means a group of conditions affecting the relationship between the amount of light emitted by the stimulable phosphor sheet during image read-out and the output of a read-out means. For example, the term "read-out condition" may refer to a read-out gain and a scale factor which defines the relationship between the input to the read out means and the output therefrom, or the energy intensity of the stimulating rays used when the radiation image is read-out.

The term "energy level of a light beam" as used herein means the level of energy of the light beam to which the stimulable phosphor sheet is exposed per unit area. In cases where the energy of the light emitted by the stimulable phosphor sheet depends on the wavelength of the light beam, i.e. has a sensitivity which depends on the wavelength of the light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths or different intensities may be used. The intensity of a light beam may be changed by a laser beam source, or the like, or by moving an ND filter or the like into and out of the optical path of the light beam. Alternatively, the energy level of a light beam also changes when the diameter of the light beam is changed, i.e. the scanning density is changed, or when the speed with which the light beam scans the stimulable phosphor sheet is changed.

Regardless of whether a preliminary read-out operation is or is not carried out, it has also been proposed to adjust the conditions under which an image signal (or a preliminary read-out image signal) is processed on the basis of the results of an analysis of the image signal or the preliminary read-out image signal. This proposed method is applicable both when a radiation image is recorded on a recording medium such as a conventional X-ray film and when a radiation image is recorded on a stimulable phosphor sheet.

In general, an operation (hereinafter referred to as an EDR) for calculating the values of the read-out condition and/or the conditions under which an image signal is to be processed is carried out automatically by a group of algorithms which analyze the image signal (or a preliminary read-out image signal). The selection of which algorithms are appropriate for a specific image signal depends on the characteristics of the recorded image. Such characteristics include, for example, what portion of an object is represented by the recorded image (e.g. the head, the chest or the abdomen in cases where the object is a human body) and what mode was used when the image was recorded (e.g. as ordinary image recording mode, a contrasted image recording mode or an enlarged image recording mode). A large number of image signals detected from a large number of radiation images are statistically processed and classified according to the characteristics of the recorded images, such as those characteristics mentioned above. The algorithms which calculate the read-out conditions are designed on the basis of the results obtained from this processing.

However, because the algorithms selected for an EDR are designed on the basis of the results of the statistical processing of a large number of image signals as described above, the algorithms cannot be appropriate for all radiation images, even though they are selected on the basis of specific characteristics of a recorded image. In cases where an unsuitable EDR is carried out on an image signal, a visible image having a density and contrast which make it unsuitable for viewing purposes is obtained when the visible image is reproduced by use of the image signal detected from the radiation image. In the worst case, a visible image which cannot provide the necessary information about a radiation image is obtained, and the image must be rerecorded. Also, in cases where the object is a human body, the radiation dose to the human body is doubled when the recording of the image is repeated. This problem should be avoided because radiation is harmful to the human body.

Examples of cases where the aforesaid problems arise will be described hereinbelow.

One of the characteristics of a recorded image which should be considered when selecting the algorithms for an EDR is that unnecessary portions of an object may be recorded on a recording medium when scattered radiation impinges upon those portions. Also, radiation may impinge directly upon a portion of a recording medium without being passed through or reflected by an object. In this manner, an image signal picks up unnecessary components which must be removed in order to obtain an image signal representing only the desired portions of a radiation image.

FIGS. 4A and 4B are graphs showing probability density functions of preliminary read-out image signals SP detected by preliminary read-out operations carried out on two stimulable phosphor sheets.

FIG. 4A shows an example of the probability density function of a preliminary read-out image signal SP detected from a radiation image for which an EDR is suitable which is of the type accounting for most (for example, 99.5%) radiation images.

With reference to FIG. 4A, the values of the preliminary read-out image signal SP which were obtained by detecting the light emitted by a stimulable phosphor sheet during a preliminary read-out operation and which are proportional to the amount of light emitted are plotted on the horizontal axis, which has a logarithmic scale. The relative frequency of occurrence of the values of the preliminary read-out image signal SP is plotted on the vertical axis at the upper part of the graph, and the values of the image signal obtained during the final read-out operation are plotted on a logarithmic scale on the vertical axis at the lower part of the graph. In this case, the probability density function of the preliminary read-out image signal SP is composed of projecting portions A, B and C, and it is assumed that the projecting portion B corresponds to the part of a radiation image which it is necessary to reproduce. By way of example, in order to find the projecting portion B, the values of the probability density function are compared to a predetermined threshold value T, starting with the value of the function at the minimum value SL of the preliminary read-out image signal SP and working along the direction of increase of the image signal values, i.e. along the chained line. When the probability function crosses through the threshold value T, a calculation is made to find out whether the function is rising or falling. In this manner, a second rising point "a" and a second falling point "b" are found. The maximum and minimum values of the preliminary read-out image signal at the points "b" and "a" are denoted by Smax and Smin, respectively. The read-out condition for the final read-out is set so that during the final read-out operation the image information represented by the emitted light signal for values of the emitted light falling within the range of Smax to Smin is reproduced accurately. Specifically, the read-out condition for the final read-out is set so that Smax and Smin of the preliminary read out image signal SP are detected respectively as the maximum image signal value Qmax and the minimum image signal value Qmin in the final read-out. The maximum image signal value Qmax and the minimum image signal value Qmin in turn correspond respectively to the maximum density Dmax and the minimum density Dmin within the predetermined correct density range of the visible image ultimately reproduced. More specifically, the read-out condition for the final read-out is set so that during the final read-out operation the image information represented by values of the emitted light signal falling within the range of Smax to Smin is detected as an image signal with values lying on the straight line G shown in FIG. 4A.

In the manner described above, for most of the radiation images, the read-out condition for the final read-out can be adjusted appropriately. However, in some cases, the correct read-out condition cannot be determined with this method. One such case will be described hereinbelow.

FIG. 4B shows the probability density function of a preliminary read-out image signal SP′ detected from a radiation image of an object approximate to the object, the radiation image of which yielded the probability density function shown in FIG. 4A. In the case of both FIGS. 4A and 4B, the radiation images of the objects (by way of example, the chest of a human body) were recorded under the same image recording conditions, i.e. the characteristics of the recorded images were the same.

When the probability density function shown in FIG. 4B is compared with that shown in FIG. 4A, projecting portions B′ and C′ approximate the projecting portions B and C, respectively. However, a projecting portion A′ differs from the projecting portion A, in that it is divided into two projecting portions, A1′ and A2′.

When the method described above is applied to the probability density function shown in FIG. 4B, the values of the probability density function are compared to the predetermined threshold value T. Starting from the value of the function corresponding to the minimum value SL' of the preliminary read-out image signal SP', whenever the value of the function crosses over the threshold value T, a calculation is made as to whether the function is rising or falling. In this manner, a second rising point a' and a second falling point b' are found. However, the range of the preliminary read-out image signal SP' between the points a' and b' is different and far apart from the range (of the projecting portion B') corresponding to the parts of the radiation image, which it is necessary to reproduce. If the final read-out operation is carried out so that during the final read-out the image information represented by an emitted light signal with values falling within the range between the points a' and b' is detected as an image signal with values lying on a straight line G', the image signal thus obtained will not contain the necessary image information, and cannot yield a useful visible image. In such cases, the recording of the radiation image of the object must be repeated.

Besides the extreme case described above, an inaccurate EDR deteriorates the image quality of a reproduced visible image.

In order to eliminate the problems caused by performing an automatic EDR, it has been proposed to enable both an automatic EDR and the manual selection and entry of the read-out condition and/or the image processing condition.

However, with this proposed technique, an operator must select the read-out condition and/or the image processing condition before a visible image is reproduced because when the final read-out operation is carried out and the image signal is processed, the read-out condition and/or the image processing condition are used. Therefore, the operator must select the read-out condition and/or the image processing condition by presuming, based on experience or intuition, how the read-out condition and/or the image processing condition will affect the state of the visible image which will ultimately be reproduced. It is not always possible to select the correct read-out condition and/or the correct image processing condition, and consequently a visible image having poor image quality is often reproduced.

An example of deterioration of the image quality will hereinbelow be described with reference to FIG. 4B. It is known that necessary image information is lost when the read-out condition for the final read-out is set so that image signal values lying on the straight line G' are obtained, and the appropriate read-out condition is unknown. In such cases, in order to reproduce parts of the radiation image represented by values of the emitted light falling outside the range defined in FIG. 4B, the read-out condition may be readjusted so that image signal values lying on a straight line G" are obtained. When the read-out condition is readjusted in this manner, image signal values corresponding to the parts of the radiation image, which it is necessary to reproduce (which correspond to the projecting portion B'), fall within a narrow range from Q1 to Q2. Therefore, only part of the range from Qmin to Qmax represents a usable part of the image signal. As a result, the resolution of the usable part of the image signal deteriorates, and the density resolution of the ultimately reproduced visible image decreases. Also, the range from Q1 to Q2 is closer to Qmax, and therefore a visible image generally having too high a density is reproduced.

SUMMARY OF THE INVENTION

The primary object of the present invention is to provide a radiation image read-out apparatus which enables an operator to select an appropriate read-out condition and/or an appropriate image processing condition without relying upon experience or intuition.

Another object of the present invention is to provide a radiation image read-out apparatus which facilitates the reproduction of a visible image having good image quality.

FIG. 1A is a block diagram showing the general configuration of the first radiation image read-out apparatus in accordance with the present invention wherein a preliminary read-out operation is carried out.

With reference to FIG. 1A, the first radiation image read-out apparatus in accordance with the present invention comprises:

(i) a preliminary read-out means 1 for scanning a stimulable phosphor sheet, on which a radiation image has been stored, with a light beam in order to release part of the energy stored during exposure to radiation as light emitted from said stimulable phosphor sheet, detecting the light emitted by said stimulable phosphor sheet, and obtaining a preliminary read-out image signal SP which approximately represents said radiation image, (ii) a final read-out means 2 for scanning said stimulable phosphor sheet with a light beam having an energy intensity higher than that of said light beam used in said preliminary read-out means 1, detecting light emitted by said stimulable phosphor sheet when it is thus scanned, and obtaining an image signal SQ which represents said radiation image, (iii) an image processing means 3 for receiving said image signal SQ and carrying out image processing of said image signal SQ, and (iv) a condition adjusting means 4 for receiving said preliminary read-out image signal SP, adjusting a read-out condition C1 for use in obtaining said image signal SQ and/or an image processing condition C2 for use in carrying out image processing, said adjustment being effected on the basis of information carried by said preliminary read-out image signal SP, and feeding said read-out condition C1 into said final read-out means 2 and/or feeding said image processing condition C2 into said image processing means 3. Said condition adjusting means 4 is constituted of:

(a) a storage section 4a for storing said preliminary read-out image signal SP, (b) a plural conditions operating section 4b for reading said preliminary read-out image signal SP from said storage section 4a, carrying out a plurality of condition adjustment operating processes based on said preliminary read-out image signal SP in order to calculate a plurality of read-out conditions to be used in obtaining an image signal SQ and/or a plurality of image processing conditions to be used in carrying out image processing of the image signal SQ, and carrying out a plurality of image reproduction operating processes based on said preliminary read-out image signal SP so as to obtain images corresponding to the images each of which would be reproduced if the image signal SQ were obtained by using each of a plurality of said read-out conditions thus calculated and/or the image signal SQ were image processed by using each of a plurality of said image processing conditions thus calculated, (c) a plural images displaying section 4c which uses each of a plurality of preliminary read-out image signals obtained from said image reproduction operating processes to display each of a plurality of images, and (d) a designating section 4d for designating one of the plurality of said images displayed at said plural images displaying section 4c, said plural conditions operating section 4b feeding a read-out condition C1, which corresponds to said image designated by said designating section 4d, into said final read-out means 2, and/or feeding an image processing condition C2, which corresponds to said image designated by said designating section 4d, into said image processing means 3.

The term "condition adjustment operating process" as used herein means a process (EDR) for finding the range in the values of the amount of light emitted by the stimulable phosphor sheet, which when converted into an image signal and then into a reproduced visible image will provide the necessary information about the radiation image, and for calculating the read-out condition and/or the image processing condition on the basis of said range. The term "a plurality of condition adjustment operating processes" as used herein means a plurality of operating processes (EDR's) carried out by respective different algorithms.

The term "different algorithms" as used herein means, for example, various methods for determining the range in the values of the amount of light emitted by a stimulable phosphor sheet which is necessary in order for the finally reproduced visible image to contain the necessary image information.

As described above with reference to FIG. 4A, the projecting portion B (which corresponds to the range in the amount of emitted light which when detected eventually results in a visible image containing the necessary image information) is found by comparing the values of the probability density function with the threshold value T. The range in the preliminary read-out signal SP between the values corresponding to the points "a" and "b" is taken as the range resulting in a reproduced visible image containing the necessary image information. Specifically, in this method, both the maximum value and the minimum value in the range resulting in a reproduced visible image containing the necessary image information are determined as disclosed in Japanese Unexamined Pat. Publication No. 60(1985)-156055. It is also possible to employ (1) a method as disclosed in Japanese Unexamined Pat. Publication No. 60(1985)-185944 wherein only the maximum value corresponding to the point "b" shown in FIG. 4A is determined, a value obtained by subtracting a predetermined value from the maximum value is taken as the minimum value, and the range between the maximum value and the minimum value is taken as the range resulting in a visible image containing the necessary image information, (2) a method as disclosed in Japanese Unexamined Pat. Publication No. 61(1986)-280163 wherein only the minimum value corresponding to the point "a" shown in FIG. 4A is determined, a value obtained by adding a predetermined value to the minimum value is taken as the maximum value, and the range between the minimum value and the maximum value is taken as the range resulting in a visible image containing the necessary image information, (3) a method as proposed in Japanese Pat. Application No. 62(1987)-67302 wherein a difference histogram is used, (4) a method as disclosed in Japanese Unexamined Pat. Publication No. 61(1986)-170730 wherein a cumulative histogram is used, or (5) a method as proposed in Japanese Pat. Application No. 62(1987)-96716 wherein a histogram is divided into a plurality of small regions by using a discrimination standard.

The radiation image read-out apparatus in accordance with the present invention may also be constituted so that, instead of carrying out a plurality of condition adjustment operating processes as described above, a single predetermined condition adjustment operating process is carried out in order to calculate a read-out condition and/or an image processing condition.

FIG. 1B is a block diagram showing the general configuration of the second radiation image read-out apparatus in accordance with the present invention. In FIG. 1B, similar elements are numbered with the same reference numerals with respect to FIG. 1A.

With reference to FIG. 1B, the second radiation image read-out apparatus in accordance with the present invention comprises the preliminary read-out means 1, the final read-out means 2, the image processing means 3, and a condition adjusting means 5. The condition adjusting means 5 is different from the condition adjusting means 4 shown in FIG. 1A. Specifically, the condition adjusting means 5 is constituted of:

(a) a storage section 5a for storing said preliminary read-out image signal SP, (b) an operating section 5b for reading said preliminary read-out image signal SP from said storage section 5a, carrying out a condition adjustment operating process based on said preliminary read-out image signal SP in order to calculate the read-out condition to be used in obtaining an image signal SQ and/or the image processing condition to be used in carrying out image processing of the image signal SQ, and carrying out a plurality of image reproduction operating processes based on said preliminary read-out image signal SP so as to obtain an image corresponding to the image which would be reproduced if the image signal SQ were obtained by using said read-out condition thus calculated and/or the image signal SQ were image processed by using said image processing condition thus calculated, and to obtain a single such image or a plurality of such images in which the density and/or contrast of said image corresponding to the image which would be reproduced are changed, (c) a plural images displaying section 5c which uses each of a plurality of preliminary read-out image signals obtained from said image reproduction operating processes to display each of a plurality of images, and (d) a designating section 5d for designating one of the plurality of said images displayed at said plural images displaying section 5c, said operating section 5b feeding a read-out condition C1, which corresponds to said image designated by said designating section 5d, into said final read-out means 2, and/or feeding an image processing condition C2, which corresponds to said image designated by said designating section 5d, into said image processing means 3.

In the radiation image read-out apparatus in accordance with the present invention, a plurality of images may not be displayed as shown in FIGS. 1A and 1B.

FIG. 1C is a block diagram showing the general configuration of the third radiation image read-out apparatus in accordance with the present invention. In FIG. 1C, similar elements are numbered with the same reference numerals with respect to FIG. 1A.

With reference to FIG. 1C, the third radiation image read-out apparatus in accordance with the present invention comprises the preliminary read-out means 1, the final read-out means 2, the image processing means 3, and a condition adjusting means 6. The condition adjusting means 6 is different from the condition adjusting means 4 shown in FIG. 1A and the condition adjusting means 5 shown in FIG. 1B. Specifically, the condition adjusting means 6 is constituted of:

(a) a storage section 6a for storing said preliminary read-out image signal SP, (b) an operating section 6b for reading said preliminary read-out image signal SP from said storage section 6a, carrying out a condition adjustment operating process based on said preliminary read-out image signal SP in order to calculate the read out condition to be used in obtaining an image signal SQ and/or the image processing condition to be used in carrying out image processing of the image signal SQ, and carrying out an image reproduction operating process based on said preliminary read-out image signal SP so as to obtain an image corresponding to the image which would be reproduced if the image signal SQ were obtained by using said read-out condition thus calculated and/or the image signal SQ were image processed by using said image processing condition thus calculated, (c) a displaying section 6c which uses the preliminary read-out image signal obtained from said image reproduction operating process to display said image, (d) an adjusting section 6e for entering an instruction into said operating section 6b in order to adjust the density and/or the contrast of the image displayed at said displaying section 6c, and (e) a designating section 6d for designating an image displayed at said displaying section 6c, said operating section 6b adjusting the density and/or contrast of the image, which is displayed at said displaying section 6c, on the basis of the instruction entered from said adjusting section 6e, and feeding a read-out condition C1, which corresponds to said image designated by said designating section 6d, into said final read-out means 2 and/or feeding an image processing condition C2, which corresponds to said image designated by said designating section 6d, into said image processing means 3.

The radiation image read-out apparatus in accordance with the present invention is also applicable when no preliminary read-out is carried out. However, in such cases, the image processing condition is calculated while the read-out condition is not calculated.

FIGS. 1D, 1E and 1F are block diagrams showing general configurations of the fourth, fifth and sixth radiation image read-out apparatuses in accordance with the present invention, wherein no preliminary read-out is carried out. The general configurations shown in FIGS. 1D, 1E and 1F correspond respectively to those shown in FIGS. 1A, 1B and 1C, excepting that no preliminary read out is carried out in these apparatuses. In FIGS. 1D, 1E and 1F, similar elements are numbered with the same reference numerals with respect to FIG. 1A. Also, in FIGS. 1E and 1F, similar elements are numbered with the same reference numerals with respect to FIG. 1D.

With reference to FIG. 1D, the fourth radiation image read-out apparatus in accordance with the present invention comprises:

(i) a read-out means 2' for obtaining an image signal SQ by reading out a radiation image from a recording medium, such as a stimulable phosphor sheet or a photographic film, on which the radiation image has been recorded, (ii) an image processing means 3 for receiving said image signal SQ and carrying out image processing of said image signal SQ, and (iii) a condition adjusting means 4' for receiving said image signal SQ, adjusting an image processing condition to be used in carrying out image processing, said adjustment being effected on the basis of said image signal SQ, and feeding said image processing condition into said image processing means 3, wherein said condition adjusting means 4' is constituted of:

(a) a storage section 4a' for storing said image signal SQ, (b) a plural conditions operating section 4b' for reading said image signal SQ from said storage section 4a', carrying out a plurality of condition adjustment operating processes based on said image signal SQ in order to calculate a plurality of image processing conditions for use in carrying out image processing, and carrying out a plurality of image reproduction operating processes based on said image signal SQ so as to obtain images corresponding to the images each of which would be reproduced if the image signal SQ were processed using each of the plurality of said image processing conditions thus calculated, (c) a plural images displaying section 4c' which uses each of a plurality of image signals obtained from said image reproduction operating processes to display each of a plurality of images, and (d) a designating section 4d' for designating one of a plurality of said images displayed at said plural images displaying section 4c', said plural conditions operating section 4b' feeding an image processing condition C2', which corresponds to said image designated by said designating section 4d', into said image processing means 3.

With reference to FIG. 1E, the fifth radiation image read-out apparatus in accordance with the present invention comprises the read-out means 2', the image processing means 3, and a condition adjusting means 5'. The condition adjusting means 5' is different from the condition adjusting means 4' shown in FIG. 1D. Specifically, the condition adjusting means 5' is constituted of:

(a) a storage section 5a' for storing said image signal SQ, (b) an operating section 5b' for reading said image signal SQ from said storage section 5a', carrying out a condition adjustment operating process based on said image signal SQ in order to calculate an image processing condition to be used in carrying out image processing, and carrying out a plurality of image reproduction operating processes based on said image signal SQ so as to obtain an image corresponding to the image which would be reproduced if the image signal SQ were processed using said image processing condition thus calculated, and to obtain a single such image or a plurality of images in which the density and/or contrast of said image corresponding to the image which would be reproduced are changed, (c) a plural images displaying section 5c' which uses each of a plurality of image signals obtained from said image reproduction operating processes to display each of a plurality of images, and (d) a designating section 5d' for designating one of a plurality of said images displayed at said plural images displaying section 5c', said operating section 5b' feeding an image processing condition C2', which corresponds to said image designated by said designating section 5d', into said image processing means 3.

With reference to FIG. 1F, the sixth radiation image read-out apparatus in accordance with the present invention comprises the read-out means 2', the image processing means 3, and a condition adjusting means 6'. The condition adjusting means 6' is different from the condition adjusting means 4' shown in FIG. 1D and the condition adjusting means 5' shown in FIG. 1E. Specifically, the condition adjusting means 6' is constituted of:

(a) a storage section 6a' for storing said image signal SQ, (b) an operating section 6b' for reading said image signal SQ from said storage section 6a', carrying out a condition adjustment operating process based on said image signal SQ in order to calculate the image processing condition for use in carrying out image processing, and carrying out an image reproduction operating process based on said image signal SQ so as to obtain an image corresponding to the image which would be reproduced if the image signal SQ were processed using said image processing condition thus calculated, (c) a displaying section 6c' which uses the image signal obtained from said image reproduction operating process to display said image, (d) an adjusting section 6e' for entering an instruction into said operating section 6b' in order to adjust the density and/or contrast of the image displayed at said displaying section 6c', and (e) a designating section 6d' for designating an image displayed at said displaying section 6c', said operating section 6b' adjusting the density and/or the contrast of the image, which is displayed at said displaying section 6c', on the basis of the instruction entered from said adjusting section 6e', and feeding an image processing condition C2', which corresponds to said image designated by said designating section 6d', into said image processing means 3.

In preferred embodiments of the radiation image read-out apparatuses in accordance with the present invention which are shown in FIGS. 1D, 1E and 1F, an image signal is obtained by photoelectrically detecting light which is obtained from the recording medium and which represents the radiation image recorded on the recording medium. The term "light obtained from a recording medium and representing a radiation image" as used herein embraces light emitted by a stimulable phosphor sheet when it is exposed to stimulating rays, and light which has passed through a photographic film or is reflected therefrom.

In the radiation image read-out apparatuses in accordance with the present invention which are shown in FIGS. 1A through 1F, part of the operating processes carried out by the plural conditions operating section 4b or 4b' or by the operating section 5b, 5b', 6b or 6b' may overlap part of the operating processes carried out by the image processing means 3. In such cases, the operating process may be carried out by only one of the plural conditions operating section 4b or 4b', the operating section 5b, 5b', 6b or 6b' or the image processing means 3, and results obtained after the operating process is carried out may be fed into the other part of the apparatus to which such results are necessary. The configurations of the apparatus in accordance with the present invention also embrace such cases.

The read-out condition and/or the image processing condition described above with reference to FIGS. 1A, 1B and 1C, and the image processing condition described above with reference to FIGS. 1D, 1E and 1F will hereinafter be referred to jointly as "a setting condition".

With the first and fourth radiation image read-out apparatuses shown in FIGS. 1A and 1D, a plurality of setting conditions are calculated by the plural conditions operating section 4b or 4b' by a plurality of different EDR's. The plural images displaying section 4c or 4c' displays a plurality of visible images, each of which would be reproduced if the image processing or the like were carried out by using each of the plurality of the setting conditions. The best image among the plurality of the images is designated from the designating section 4d or 4d', and the setting condition which corresponds to the best image designated is employed for image processing or the like. By using the plural images displaying section 4c or 4c', an operator can confirm the state of a visible image which will ultimately be reproduced. Therefore, the operator can select an appropriate setting condition without relying upon experience or intuition.

With the second and fifth radiation image read-out apparatuses in accordance with the present invention which are shown in FIGS. 1B and 1E, the operating section 5b or 5b' calculates a setting condition with a predetermined EDR. The plural images displaying section 5c or 5c' displays an image corresponding to the visible image which would be reproduced if the image processing or the like were carried out by using the setting condition thus calculated, and it also displays images in which the density and/or contrast of said image corresponding to the visible image which would be reproduced are changed. The best image among a plurality of the images is designated from the designating section 5d or 5d', and the setting condition which corresponds to the best image designated is employed for image processing or the like. Therefore, as with the first and fourth radiation image read-out apparatuses shown in FIGS. 1A and 1D, an appropriate setting condition can be selected.

With the third and sixth radiation image read-out apparatuses in accordance with the present invention which are shown in FIGS. 1C and 1F, an image obtained from the operating section 6b or 6b' is displayed at the displaying section 6c or 6c'. The density and/or contrast of the image displayed is adjusted in accordance with an instruction entered from the adjusting section 6e or 6e'. When the best image is thus identified by being displayed, it is designated at the designating section 6d or 6d'. The setting condition which corresponds to the designated best image is employed for image processing or the like. Therefore, as with the radiation image read-out apparatuses shown in FIGS. 1A, 1B, 1D and 1E, an appropriate setting condition can be selected.

Accordingly, with the first to sixth radiation image read-out apparatuses in accordance with the present invention, the best possible visible image can ultimately be reproduced.

BRIEF DESCRIPTION OF THE DRAWINGS

FIGS. 2A, 2B and 2C are perspective views showing embodiments of the radiation image read-out apparatuses in accordance with the present invention, FIG. 2D is a perspective view showing an embodiment of the X-ray image read-out apparatus in accordance with the present invention, wherein an X-ray image recorded on an X-ray film is read out, FIG. 3 is a circuit diagram showing an equivalent circuit for a MOS sensor.

DESCRIPTION OF THE PREFERRED EMBODIMENTS

Figure 1A:
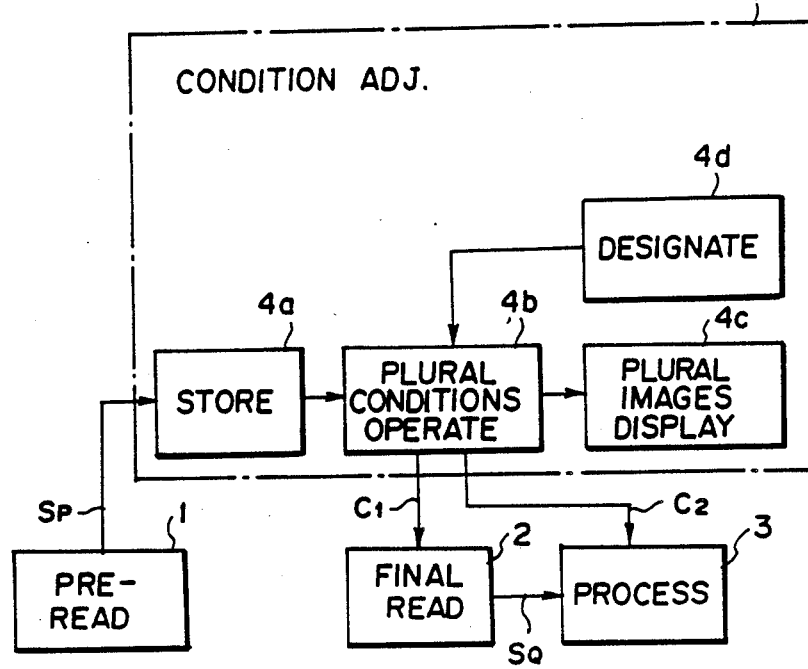
FIGS. 1A through 1F are block diagrams showing general configurations of the first through sixth radiation image read-out apparatuses in accordance with the present invention.
Figure 1B:
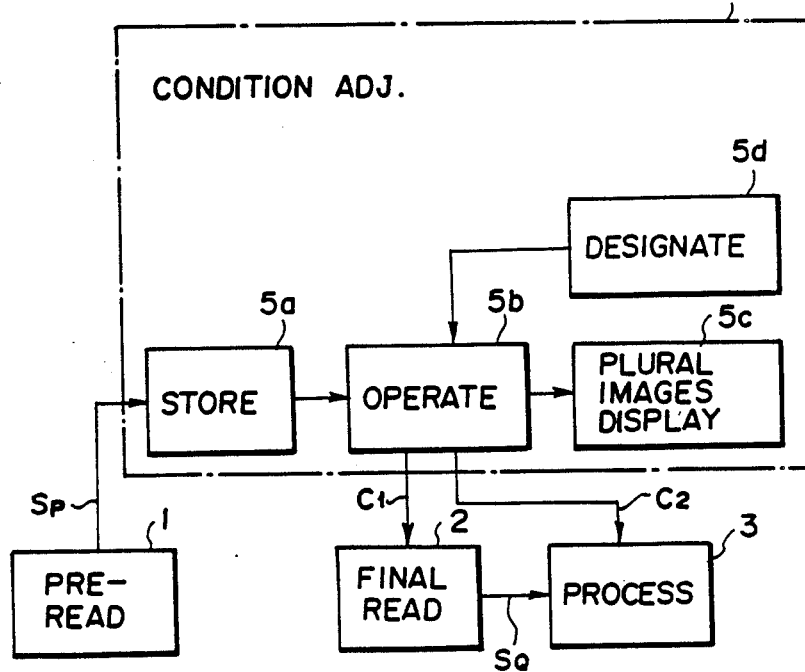
Figure 1C:
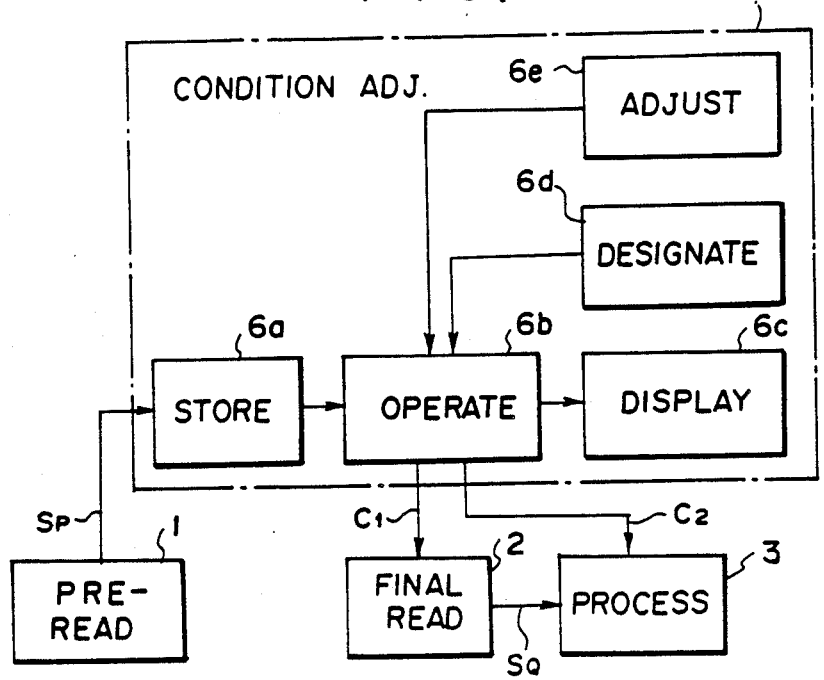
Figure 1D:
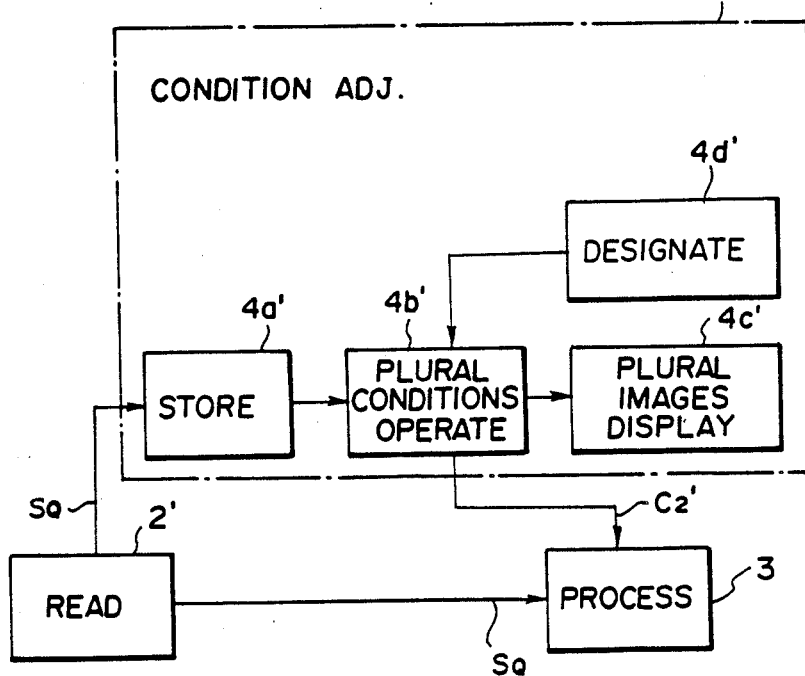
Figure 1E:
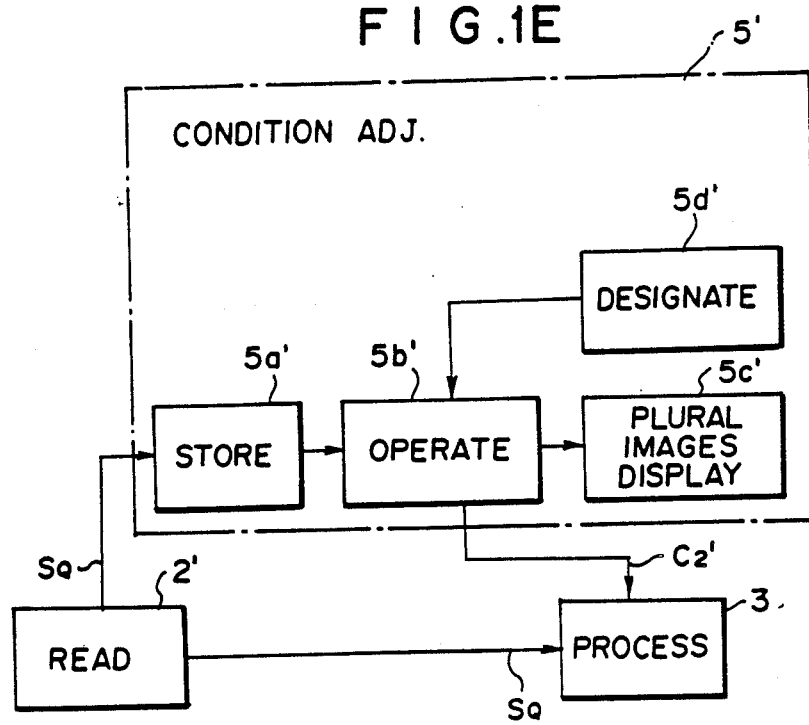
Figure 1F:
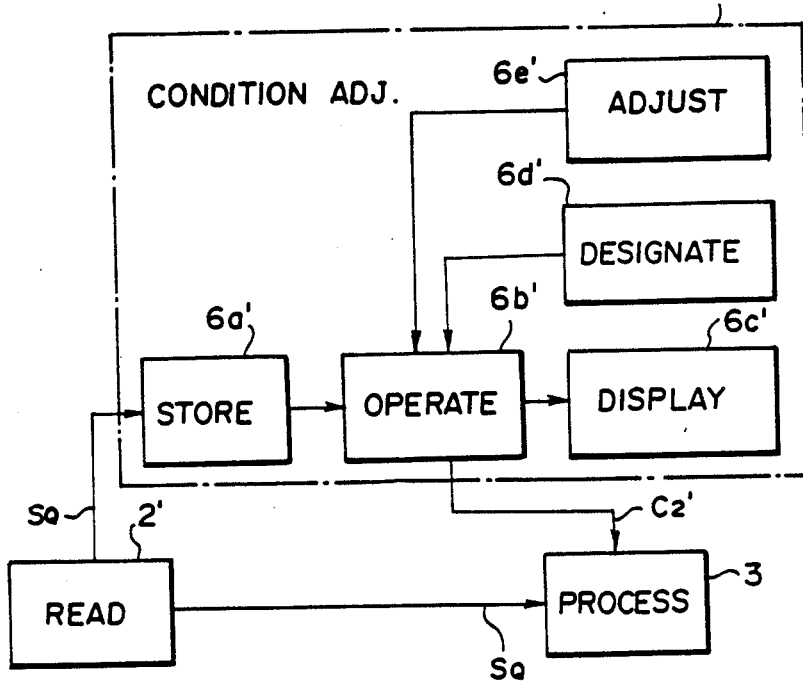

The present invention will hereinbelow be described in further detail with reference to the accompanying drawings.

With reference to FIG. 2A, an embodiment of the radiation image read-out apparatus in accordance with the present invention utilizes a stimulable phosphor sheet and carries out a preliminary read-out operation.

A stimulable phosphor sheet 11 on which a radiation image has ben stored is placed at a predetermined position in a preliminary read-out means 100 which carries out a preliminary read-out operation by scanning the stimulable phosphor sheet 11 with a light beam having a low energy level, thereby releasing only part of the energy stored during exposure to radiation from the stimulable phosphor sheet 11. The stimulable phosphor sheet 11 is conveyed in a sub-scanning direction indicated by the arrow Y by a sheet conveyance means 13 constituted of an endless belt or the like operated by a motor 12. On the other hand, stimulating rays 15 produced by a laser beam source 14 are reflected and deflected by a rotating polygon mirror 16, which is quickly rotated by a motor 23 in the direction indicated by the arrow, and the stimulating rays 15 pass through a converging lens 17 constituted of an fθ lens or the like. The direction of the optical path of the stimulating rays 15 is then changed by a mirror 18, and the stimulating rays 15 impinge upon the stimulable phosphor sheet 11 and scan across it in a main scanning direction indicated by the arrow X, which main scanning direction is approximately normal to the sub-scanning direction indicated by the arrow Y. When the stimulable phosphor sheet 11 is exposed to the stimulating rays 15, the exposed portion of the stimulable phosphor sheet 11 emits light 19 with an intensity proportional to the amount of energy stored during exposure to radiation. The emitted light 19 is guided by a light guide member 20, and photoelectrically detected by a photomultiplier 21 which acts as a photodetector. The light guide member 20 is made from a light guiding material such as an acrylic plate, and has a linear light input face 20a positioned so that it extends along the main scanning line on the stimulable phosphor sheet 11, and a ring-shaped light output face 20b is positioned in close contact with a light receiving face of the photomultiplier 21. The emitted light 19 entering the light guide member 20 through its light input face 20a is guided through repeated total reflection inside of the light guide member 20, emanates from the light output face 20b, and is received by the photomultiplier 21. In this manner, the intensity of the emitted light 19, which carries the information about the radiation image, is detected by the photomultiplier 21.

an analog output signal S generated by the photomultiplier 21 is amplified by an amplifier 26, and digitized by an A/D converter 27 into a preliminary read-out image signal SP.

In the preliminary read-out operation, a read-out condition such as the voltage applied to the photomultiplier 21 or the amplification factor of the amplifier 26 is adjusted so that image information can be detected for a wide range in the amount of radiation energy stored on the stimulable phosphor sheet 11.

The preliminary read-out image signal SP obtained in the manner described above is fed into a storage section 28 in a condition adjusting means 200 and stored therein. Thereafter, the preliminary read-out image signal SP is read from the storage section 28, and fed into a plural conditions operating section 29. The plural conditions operating section 29 calculates a plurality of read-out conditions with a plurality of EDR's using different algorithms. Also, the plural conditions operating section 29 investigates what density and/or what contrast a visible image will have when the final read-out operation is carried out by using each of the plurality of the read-out conditions calculated, and the visible image is ultimately reproduced by use of the image signal obtained during the final read-out operation. A plurality of images are produced, which simulate the visible images which would ultimately be reproduced if each of the calculated read-out conditions were made use of during the reproduction of the final visible image.

A plurality of the images thus produced are displayed on a CRT display device 30 which constitutes a plural images displaying section. Therefore, the operator can view the plurality of images displayed on the CRT display device 30 and enter a command into the apparatus, which designates the best image among the images displayed, from a keyboard 31 which constitutes a designating section.

After the best image is designated, the read-out condition which corresponds to the best image is fed into a final read-out means 100'. In the final read-out means 100', the voltage applied to a photomultiplier 21' and the amplification factor of an amplifier 26' are set in accordance with the read-out condition.

A stimulable phosphor sheet 11' on which the preliminary read-out has been finished is placed at a predetermined position in the final read-out means 100', and scanned with a light beam 15' having an energy level higher than that of the light beam 15 used in the preliminary read-out operation. In this manner, an image signal SQ is detected by using the read-out condition adjusted as described above. The configuration of the final read-out means 100' is nearly the same as that of the preliminary read-out means 100, and therefore elements corresponding to those constituting the preliminary read-out means 100 are numbered with corresponding primed reference numerals in FIG. 2A.

After it is digitized in an A/D converter 27', the image signal SQ is fed into an image processing means 50, which carries out appropriate image processing of the image signal SQ. After being image processed, the image signal is fed into a reproducing apparatus 60, which reproduces a visible image by use of the image signal.

In the aforesaid embodiment, the read-out condition for the final read-out is adjusted by the condition adjusting means 200. Alternatively, the final read-out may be carried out by using a single predetermined read-out condition regardless of the characteristics of the preliminary read-out image signal SP. The condition adjusting means 200 may adjust the image processing condition which is to be used in the image processing means 50 for carrying out image processing of the image signal SQ. The image processing condition calculated by the condition adjusting means 200 may then be fed into the image processing means 50 as indicated by the chained line in FIG. 2A. The condition adjusting means 200 may also adjust both the read-out condition and the image processing condition.

Figure 2B:
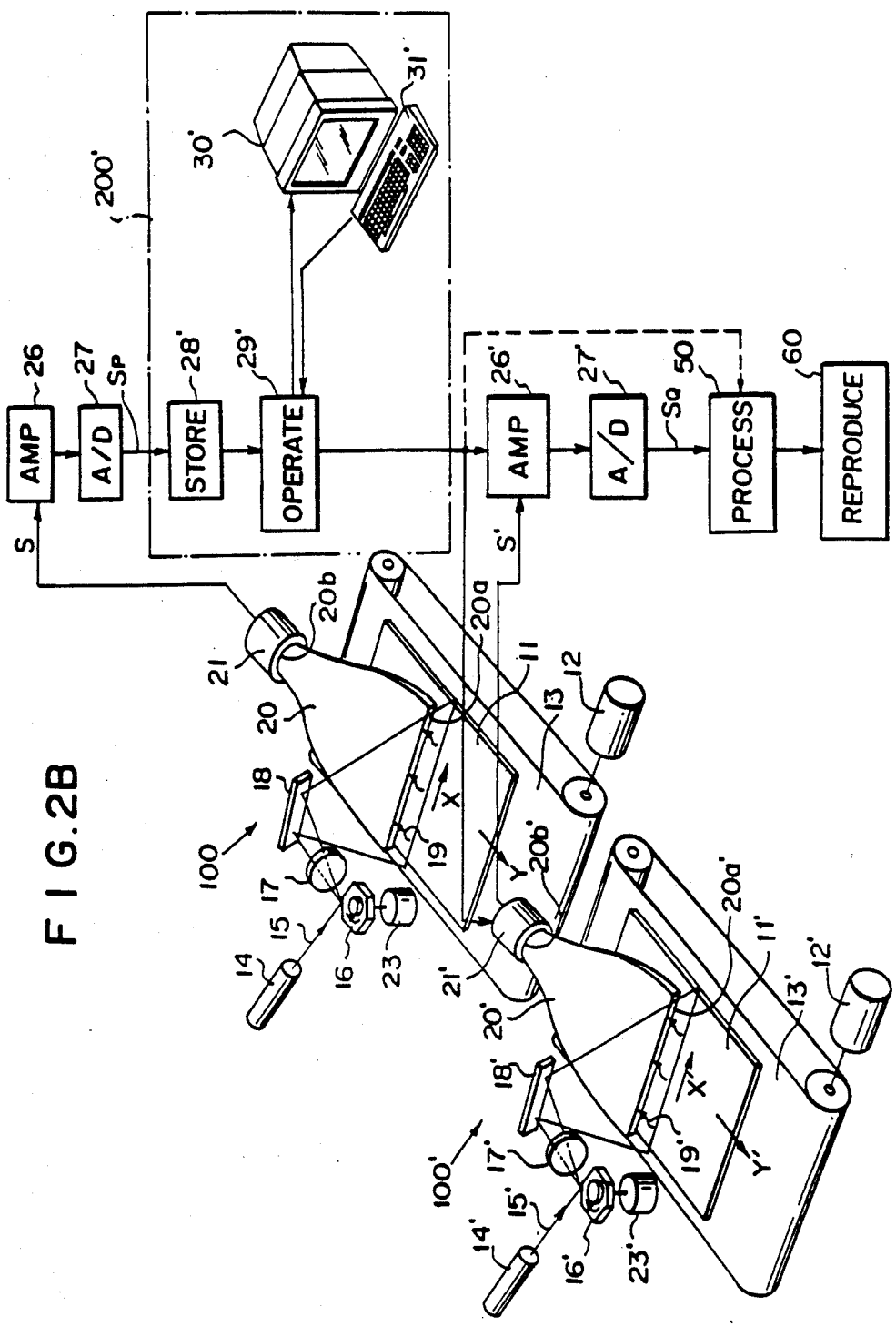
Figure 4A:
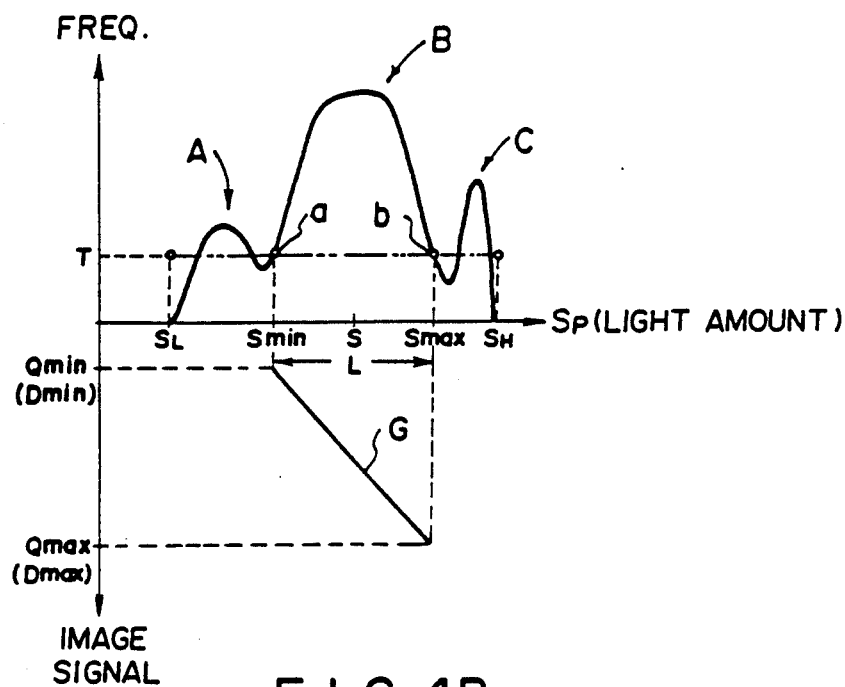
FIGS. 4A and 4B are graphs showing probability density functions of preliminary read-out image signals.
Figure 4B:
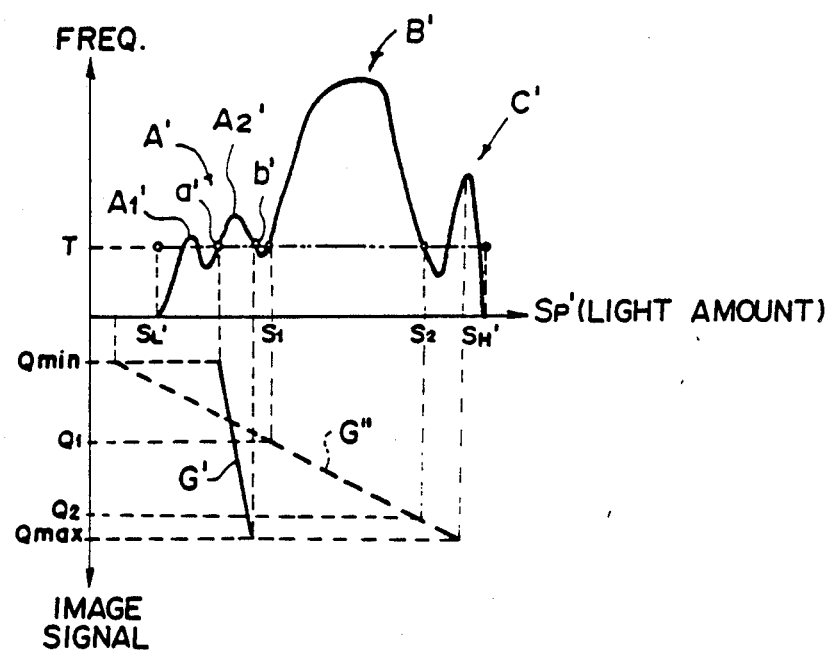

Another embodiment of the radiation image read-out apparatus in accordance with the present invention will hereinbelow be described with reference to FIG. 2B. In FIG. 2B, similar elements are numbered with the same reference numerals with respect to FIG. 2A.

The preliminary read-out image signal SP generated by the A/D converter 27 is fed into a storage section 28' in a condition adjusting means 200' and stored therein. Thereafter, the preliminary read-out image signal SP is read from the storage section 28', and fed into an operating section 29'. The operating section 29' calculates a read-out condition on the basis of the preliminary read-out image signal SP. Also, the operating section 29' investigates what density and/or what contrast a visible image will have when the final read-out operation is carried out using the read-out condition calculated and the visible image is ultimately reproduced by use of the image signal obtained during the final read-out operation. An image simulating the visible image which would ultimately be reproduced is thus produced. The operating section 29' also produces images in which the density and/or contrast of said image simulating the visible image are changed.

The plurality of the images thus produced are displayed on a CRT display device 30' which constitutes a plural images displaying section. Therefore, the operator can view the plurality of the images displayed on the CRT display device 30' and enter a command, which designates the best image among the images displayed, at a keyboard 31' which constitutes a designating section.

After the best image is designated, the read-out condition which corresponds to the best image is fed into the final read-out means 100'. In the final read-out means 100', the voltage applied to the photomultiplier 21' and the amplification factor of the amplifier 26' are set in accordance with the read-out condition.

In the embodiments shown in FIGS. 2A and 2B, the preliminary read-out means 100 and the final read-out means 100' are separate from each other. Alternatively, because the configurations of the preliminary read-out means 100 and the final read-out means 100' are approximately identical to each other, a single read-out means may be utilized to perform both the preliminary read-out operation and the final read-out operation. In this case, after the preliminary read-out operation is carried out by scanning the stimulable phosphor sheet 11 with a light beam having a low energy level, the stimulable phosphor sheet 11 may be moved back to the position from which the image read-out operation is started. Thereafter, the final read-out operation may be carried out by scanning the stimulable phosphor sheet 11 with a light beam having a high energy level.

In cases where a single read-out means is utilized to perform both the preliminary read-out operation and the final read-out operation, it is necessary to change the intensity of the light beam used in the preliminary read-out operation and the final read-out operation. For this purpose, a laser beam source or the like may change the intensity of the light beam, or the intensity of the light beam may be changed by moving an ND filter or the like into and out of the optical path of the light beam. Alternatively, the diameter of the light beam may be changed, or the speed with which the phosphor sheet is scanned may be changed.

A further embodiment of the radiation image read-out apparatus in accordance with the present invention will hereinbelow be described with reference to FIG. 2C. In this embodiment, a stimulable phosphor sheet is utilized as in the aforesaid embodiments, but no preliminary read-out operation is carried out.

The configuration of a read-out means 100" is approximately identical to that of the final read-out means 100' shown in FIGS. 2A and 2B. Therefore, in FIG. 2C, similar elements are numbered with the same reference numerals with respect to FIGS. 2A and 2B.

The image signal SQ generated by the A/D converter 27' is fed into an image processing means 50' and a storage section 28" in a condition adjusting means 200". Thereafter, the image signal SQ stored in the storage section 28" is read therefrom, and fed into an operating section 29". On the basis of the image signal SQ, the operating section 29" calculates an image processing condition which is to be used in the image processing means 50' for carrying out image processing of the image signal SQ. Also, the operating section 29" investigates what density and/or what contrast a visible image would have if the image signal were processed using the image processing condition calculated and the visible image were ultimately reproduced by use of the processed image signal. An image simulating the visible image which would ultimately be reproduced is thus produced. The image thus produced is displayed on a CRT display device 30" which constitutes a displaying section. An operator views the image displayed on the CRT display device 30" and operates a keyboard 31", which functions as an adjusting section and a designating section, in order to adjust the density and/or the contrast of the image displayed on the CRT display device 30" so that an image of the best possible quality can be obtained. When the image of the best quality is displayed on the CRT display device 30", an instruction is entered at the keyboard 31" specifying that the image which is being currently displayed on the CRT display device 30" is the image of the best quality.

After the instruction is entered from the keyboard 31", the image processing condition which corresponds to the image of the best quality is fed from the operating section 29" into the image processing means 50'.

Thereafter, the image processing means 50' carries out image processing of the image signal SQ by using the selected image processing condition. After it is processed, the image signal is fed into the reproducing apparatus 60, which uses the image signal and reproduces a visible image therefrom.

In cases where the operating section 29" accurately processes the image signals, instead of producing a rough image which is merely suitable for image simulation, a single common operating means may replace both the operating section 29" and the image processing means 50'.

The present invention is not limited to the aforesaid embodiments wherein a stimulable phosphor sheet is used, and is also applicable to, for example, an X-ray image read-out apparatus wherein conventional X-ray film is used.

With reference to FIG. 2D, a sheet of X-ray film 70 on which an X-ray image has been recorded is placed at a predetermined position, and is conveyed in the direction indicated by the arrow Y" by a film conveyance means 71.

Reading light 73 produced by an elongated light source 72 extending in one direction is converged by a cylindrical lens 74, and is linearly irradiated onto the X-ray film 70 along the directions indicated by the arrow X", which are approximately normal to the direction indicated by the arrow Y". A MOS sensor 75 is positioned below the X-ray film 70 so that the MOS sensor 75 can receive the reading light 73 which has passed through the X-ray film 70, the intensity of which light has been modulated in accordance with the X-ray image recorded on the X-ray film 70. The MOS sensor 75 comprises a plurality of solid state photoelectric conversion devices which are arrayed linearly at intervals equal to the intervals between the picture elements of the X-ray image along the directions indicated by the arrow X". As long as the X-ray film 70 is conveyed in the direction indicated by the arrow Y" while being exposed to the reading light 73, the MOS sensor 75 detects the reading light, which has passed through the X-ray film 70, at predetermined intervals corresponding to the intervals between the picture elements of the X-ray image along the direction indicated by the arrow Y".

FIG. 3 shows an equivalent circuit for the MOS sensor 75.

With reference to FIG. 3, photocarriers generated when the reading light 73 impinges upon the solid state photoelectric conversion devices 76, 76, . . . accumulate in capacitors Ci (i=1, 2, . . . , n) of the solid state photoelectric conversion devices 76, 76, . . . The number of photocarriers which accumulate in the capacitors Ci is detected by sequentially turning on and off the switches of a switch section 78. A shift register 77 controls the switches of the switch section 78, and a time-serial image signal is obtained. The image signal is then amplified by a pre-amplifier 79 and is output at an output terminal 80 of the pre-amplifier 79.

The analog image signal output by the MOS sensor 75 is amplified by an amplifier 26", and digitized into an image signal SQ' by a A/D converter 27".

The image signal SQ' generated by the A/D converter 27" is fed into an image processing means 50" and a storage section 28''' in a condition adjusting means 200'''. Thereafter, the image signal SQ' stored in the storage section 28''' is read therefrom, and fed into an operating section 29'''. On the basis of the image signal SQ', the operating section 29''' calculates an image processing condition which is to be used by the image processing means 50" for processing the image signal SQ'. Also, the operating section 29''' investigates what density and/or what contrast a visible image would have if the image signal were processed using the image processing condition calculated and the visible image were ultimately reproduced by use of the processed image signal. An image simulating the visible image which would ultimately be reproduced is thus produced. The image thus produced is displayed on a CRT display device 30''' which constitutes a displaying section. An operator views the image displayed on the CRT display device 30''' and operates a keyboard 31''', which functions as an adjusting section and a designating section, in order to adjust the density and/or the contrast of the image displayed on the CRT display device 30''' so that an image of the best possible quality is obtained. When the image of the best possible quality is displayed on the CRT display device 30''', an instruction is entered at the keyboard 31" specifying that the image which is being currently displayed on the CRT display device 30''' is of the best possible quality.

After the instruction is entered at the keyboard 31''', the image processing condition which corresponds to the image of the best possible quality is fed from the operating section 29''' into the image processing means 50".

Thereafter, the image processing means 50" processes the image signal SQ' by using the selected image processing condition. After it has been processed, the image signal is fed into the reproducing apparatus 60, which reproduces a visible image by using the image signal.

In the embodiment shown in FIG. 2D, the MOS sensor 75 may be replaced by a charge coupled device (CCD) or a charge priming device (CPD). Also, the X-ray image may be read out from the X-ray film 70 by two-dimensionally scanning the X-ray film 70 with a light beam in the same manner as that described above for image read-out from the stimulable phosphor sheet. Furthermore, instead of detecting light which has passed through the X-ray film 70, light reflected by the X-ray film 70 may be detected.

The present invention is applicable to various types of radiation image read-out apparatuses wherein an image signal is obtained by reading out a radiation image from a recording medium, on which the radiation image has been recorded, and wherein the image signal is processed in accordance with an image processing condition.

I claim:

1. A radiation image read-out apparatus comprising:
(i) a preliminary read-out means for scanning a stimulable phosphor sheet, on which a radiation image has been stored, with a light beam in order to release part of the energy stored during exposure to radiation as light emitted from said stimulable phosphor sheet, detecting the light emitted by said stimulable phosphor sheet, and obtaining a preliminary read-out image signal which approximately represents said radiation image,
(ii) a final read-out means for scanning said stimulable phosphor sheet with a light beam having an energy intensity higher than that of said light beam used in said preliminary read-out means, detecting light emitted by said stimulable phosphor sheet when it is thus scanned, and obtaining a final read-out image signal which represents said radiation image, (iii) an image processing means for receiving said final read-out image signal and carrying out image processing of said final read-out image signal, and (iv) a condition adjusting means for receiving said preliminary read-out image signal, adjusting a read-out condition for use in obtaining said final read-out image signal and/or an image processing condition for use in carrying out image processing, said adjustment being effected on the basis of information carried by said preliminary read-out image signal, and feeding said read-out condition into said final read-out means and/or feeding said image processing condition into said image processing means, wherein said condition adjusting means is constituted of:

(a) a storage section for storing said preliminary read-out image signal, (b) a plural conditions operating section for reading said preliminary read-out image signal from said storage section, carrying out a plurality of condition adjustment operating processes based on said preliminary read-out image signal in order to calculate a plurality of read-out conditions to be used in obtaining a final read-out image signal and/or a plurality of image processing conditions to be used in carrying out image processing of the final read-out image signal, and carrying out a plurality of image reproduction operating processes based on said preliminary read-out image signal so as to obtain images corresponding to the images each of which would be reproduced if the final read-out image signal were obtained by using each of a plurality of said read-out conditions thus calculated and/or the final read-out image signal were image processed by using each of a plurality of said image processing conditions thus calculated, (c) a plural images displaying section which uses each of a plurality of preliminary read-out image signals obtained from said image reproduction operating processes to display each of a plurality of images, and (d) a designating section for designating one of the plurality of said images displayed at said plural images displaying section, said plural conditions operating section feeding a read-out condition, which corresponds to said image designated by said designating section, into said final read-out means, and/or feeding an image processing condition, which corresponds to said image designated by said designating section, into said image processing means.

2. An apparatus as defined in claim 1 wherein said light beam is a laser beam.

3. A radiation image read-out apparatus comprising:

(i) a preliminary read-out means for scanning a stimulable phosphor sheet, on which a radiation image has been stored, with a light beam in order to release part of the energy stored during exposure to radiation as light emitted from said stimulable phosphor sheet, detecting the light emitted by said stimulable phosphor sheet, and obtaining a preliminary read out image signal which approximately represents said radiation image, (ii) a final read-out means for scanning said stimulable phosphor sheet with a light beam having an energy intensity higher than that of said light beam used in said preliminary read-out means, detecting light emitted by said stimulable phosphor sheet when it is thus scanned, and obtaining a final read-out image signal which represents said radiation image, (iii) an image processing means for receiving said final read-out image signal and carrying out image processing of said final read out image signal, and (iv) a condition adjusting means for receiving said preliminary read-out image signal, adjusting a read-out condition for use in obtaining said final read-out image signal and/or an image processing condition for use in carrying out image processing, said adjustment being effected on the basis of information carried by said preliminary read-out image signal, and feeding said read-out condition into said final read-out means and/or feeding said image processing condition into said image processing means, wherein said condition adjusting means is constituted of:

(a) a storage section for storing said preliminary read-out image signal, (b) an operating section for reading said preliminary read-out image signal from said storage section, carrying out a condition adjustment operating process based on said preliminary read-out image signal in order to calculate the read-out condition to be used in obtaining a final read-out image signal and/or the image processing condition to be used in carrying out image processing of the final read-out image signal, and carrying out a plurality of image reproduction operating processes based on said preliminary read-out image signal so as to obtain an image corresponding to an image which would be reproduced if the final read-out image signal were obtained by using said read-out condition thus calculated and/or the final read-out image signal were image processed by using said image processing condition thus calculated, and to obtain a single such image or a plurality of such images in which the density and/or contrast of said image corresponding to the image which would be reproduced are changed, (c) a plural images displaying section which uses each of a plurality of preliminary read-out image signals obtained from said image reproduction operating processes to display each of a plurality of images, and (d) a designating section for designating one of the plurality of said images displayed at said plural images displaying section, said operating section feeding a read-out condition, which corresponds to said image designated by said designating section, into said final read-out means, and/or feeding an image processing condition, which corresponds to said image designated by said designating section, into said image processing means.

4. An apparatus as defined in claim 3 wherein said light beam is a laser beam.

5. A radiation image read-out apparatus comprising:

(i) a preliminary read out means for scanning a stimulable phosphor sheet, on which a radiation image has been stored, with a light beam in order to release part of the energy stored during exposure to radiation as light emitted from said stimulable phosphor sheet, detecting the light emitted by said stimulable phosphor sheet, and obtaining a preliminary read-out image signal which approximately represents said radiation image, (ii) a final read-out means for scanning said stimulable phosphor sheet with a light beam having an energy intensity higher than that of said light beam used in said preliminary read-out means, detecting light emitted by said stimulable phosphor sheet when it is thus scanned, and obtaining a final read-out image signal which represents said radiation image, (iii) an image processing means for receiving said final read-out image signal and carrying out image processing of said final read-out image signal, and (iv) a condition adjusting means for receiving said preliminary read-out image signal, adjusting a read-out condition for use in obtaining said final read-out image signal and/or an image processing condition for use in carrying out image processing, said adjustment being effected on the basis of information carried by said preliminary read-out image signal, and feeding said read-out condition into said final read-out means and/or feeding said image processing condition into said image processing means, wherein said condition adjusting means is constituted of:

(a) a storage section for storing said preliminary read-out image signal, (b) an operating section for reading said preliminary read-out image signal from said storage section, carrying out a condition adjustment operating process based on said preliminary read-out image signal in order to calculate the read-out condition to be used in obtaining a final read-out image signal and/or the image processing condition to be used in carrying out image processing of a final read-out image signal, and carrying out an image reproduction operating process based on said preliminary read-out image signal so as to obtain an image corresponding to the image which would be reproduced if the final read-out image signal were obtained by using said read-out condition thus calculated and/or the final read-out image signal were image processed by using said image processing condition thus calculated, (c) a displaying section which uses the preliminary read-out image signal obtained from said image reproduction operating process to display said image, (d) an adjusting section for entering an instruction into said operating section in order to adjust the density and/or the contrast of the image displayed at said displaying section, and (e) a designating section for designating an image displayed at said displaying section, said operating section adjusting the density and/or contrast of the image, which is displayed at said displaying section, on the basis of the instruction entered from said adjusting section, and feeding a read-out condition, which corresponds to said image designated by said designating section, into said final read-out means and/or feeding an image processing condition, which corresponds to said image designated by said designating section, into said image processing means.

6. An apparatus as defined in claim 5 wherein said light beam is a laser beam.

7. A radiation image read-out apparatus comprising:

(i) a read-out means for obtaining an image signal by reading out a radiation image from a recording medium on which the radiation image has been recorded, (ii) an image processing means for receiving said image signal and carrying out image processing of said image signal, and (iii) a condition adjusting means for receiving said image signal, adjusting an image processing condition to be used in carrying out image processing, said adjustment being effected on the basis of said image signal, and feeding said image processing condition into said image processing means, wherein said condition adjusting means is constituted of:

(a) a storage section for storing said image signal, (b) a plural conditions operating section for reading said image signal from said storage section, carrying out a plurality of condition adjustment operating processes based on said image signal in order to calculate a plurality of image processing conditions to be used in carrying out image processing, and carrying out a plurality of image reproduction operating processes based on said image signal so as to obtain images corresponding to the images each of which would be reproduced if the image signal were image processed using each of the plurality of said image processing conditions thus calculated, (c) a plural images displaying section which uses each of a plurality of image signals obtained from said image reproduction operating processes to display each of a plurality of images, and (d) a designating section for designating one of a plurality of said images displayed at said plural images displaying section, said plural conditions operating section feeding an image processing condition, which corresponds to said image designated by said designating section, into said image processing means.

8. An apparatus as defined in claim 7 wherein said recording medium is a stimulable phosphor sheet on which a radiation image has been stored, and said read-out means obtains said image signal by scanning said stimulable phosphor sheet with a light beam in order to release the energy stored thereon during exposure to radiation as light emitted from said stimulable phosphor sheet, and detecting the light emitted by said stimulable phosphor sheet.

9. An apparatus as defined in claim 8 wherein said light beam is a laser beam.

10. A radiation image read-out apparatus comprising:

(i) a read-out means for obtaining an image signal by reading out a radiation image from a recording medium on which the radiation image has been recorded, (ii) an image processing means for receiving said image signal and carrying out image processing of said image signal, and (iii) a condition adjusting means for receiving said image signal, adjusting an image processing condition for use in carrying out image processing, said adjustment being effected on the basis of said image signal, and feeding said image processing condition into said image processing means, wherein said condition adjusting means is constituted of:

(a) a storage section for storing said image signal, (b) an operating section for reading said image signal from said storage section, carrying out a condition adjustment operating process based on said image signal in order to calculate an image processing condition to be used in carrying out image processing, and carrying out a plurality of image reproduction operating processes based on said image signal so as to obtain an image corresponding to the image which would be reproduced if the image signal were processed by using said image processing condition thus calculated, and to obtain a single such image or a plurality of such images in which the density and/or contrast of said image corresponding to the image which would be reproduced are changed, (c) a plural images displaying section which uses each of a plurality of image signals obtained from said image reproduction operating processes to display each of a plurality of images, and (d) a designating section for designating one of a plurality of said images displayed at said plural images displaying section, said operating section feeding an image processing condition, which corresponds to said image designated by said designating section, into said image processing means.

11. An apparatus as defined in claim 10 wherein said recording medium is a stimulable phosphor sheet on which a radiation image has been stored, and said read-out means obtains said image signal by scanning said stimulable phosphor sheet with a light beam in order to release the energy stored thereon during exposure to radiation as light which is emitted from said stimulable phosphor sheet, and detecting the light emitted by said stimulable phosphor sheet.

12. An apparatus as defined in claim 11 wherein said light beam is a laser beam.

13. A radiation image read-out apparatus comprising:
(i) a read-out means for obtaining an image signal by reading out a radiation image from a recording medium on which the radiation image has been recorded,
(ii) an image processing means for receiving said image signal and carrying out image processing of said image signal, and
(iii) a condition adjusting means for receiving said image signal, adjusting an image processing condition for use in carrying out image processing, said adjustment being effected on the basis of said image signal, and feeding said image processing condition into said image processing means, wherein said condition adjusting means is constituted of:

(a) a storage section for storing said image signal, (b) an operating section for reading said image signal from said storage section, carrying out a condition adjustment operating process based on said image signal in order to calculate an image processing condition to be used in carrying out image processing, and carrying out an image reproduction operating process based on said image signal so as to obtain an image corresponding to the image which would be reproduced if the image signal were processed by using said image processing condition thus calculated, (c) a displaying section which uses the image signal obtained from said image reproduction operating process to display said image, (d) an adjusting section for entering an instruction into said operating section in order to adjust the density and/or contrast of the image displayed at said displaying section, and (e) a designating section for designating an image displayed at said displaying section, said operating section adjusting the density and/or the contrast of the image, which is displayed at said displaying section, on the basis of the instruction entered from said adjusting section, and feeding an image processing condition, which corresponds to said image designated by said designating section, into said image processing means.

14. An apparatus as defined in claim 13 wherein said recording medium is a stimulable phosphor sheet on which a radiation image has been stored, and said read-out means obtains said image signal by scanning said stimulable phosphor sheet with a light beam in order to release the energy stored thereon during exposure to radiation as light emitted from said stimulable phosphor sheet, and detecting the light emitted by said stimulable phosphor sheet.

15. An apparatus as defined in claim 14 wherein said light beam is a laser beam.

* * * * *